(12) United States Patent
Korczyński et al.

(10) Patent No.: US 11,415,242 B2
(45) Date of Patent: Aug. 16, 2022

(54) SERVO VALVE

(71) Applicant: Hamilton Sundstrand Corporation, Charlotte, NC (US)

(72) Inventors: Marcin Korczyński, Wroclaw (PL); Wojciech Janiga, Wroclaw (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 236 days.

(21) Appl. No.: 16/679,526

(22) Filed: Nov. 11, 2019

(65) Prior Publication Data
US 2020/0166153 A1 May 28, 2020

(30) Foreign Application Priority Data

Nov. 27, 2018 (EP) .................................. 18461633

(51) Int. Cl.
| | |
|---|---|
| *F16K 31/124* | (2006.01) |
| *F15B 13/02* | (2006.01) |
| *F16K 11/07* | (2006.01) |
| *F15B 13/043* | (2006.01) |
| *F15B 13/04* | (2006.01) |

(52) U.S. Cl.
CPC .......... *F16K 31/1245* (2013.01); *F15B 13/02* (2013.01); *F16K 11/07* (2013.01); *F15B 13/0406* (2013.01); *F15B 13/0435* (2013.01); *F15B 13/0438* (2013.01)

(58) Field of Classification Search
CPC ...... F16K 31/1245; F16K 11/07; F15B 13/02; F15B 13/0406; F15B 13/0435; F15B 13/0438
See application file for complete search history.

(56) References Cited

U.S. PATENT DOCUMENTS 2,924,241 A * 2/1960 Bauer ................ F15B 13/0431
137/549
3,489,179 A * 1/1970 Rees, Jr. ................ F15B 5/003
137/625.62

(Continued)

FOREIGN PATENT DOCUMENTS

| EP | 1741936 A1 | 1/2007 |
| EP | 3597939 A1 | 1/2020 |

OTHER PUBLICATIONS

Extended European Search Report for International Application No. 18461633.2 dated Jun. 11, 1019. 5 pages.

*Primary Examiner* — Matthew W Jellett
*Assistant Examiner* — Christopher D Ballman
(74) *Attorney, Agent, or Firm* — Cantor Colburn LLP

(57) ABSTRACT

A servo valve comprises a member disposed in a cavity and axially-moveable therein. The member includes first and second sections, a central section located between the first and second sections and first and second transition sections respectively between the first and second sections and the central section, forming respective first and second outer surfaces angled relative to the axis (X). At least one of the transition sections comprises a non-circular cross-section having a concave portion forming at least part of the respective first and second surfaces and being at least partially aligned with and facing the respective first or second nozzle opening such that rotating the member in said cavity varies the level of obstruction of the first or second nozzle openings by the first or second outer surfaces.

16 Claims, 7 Drawing Sheets

(56) References Cited

U.S. PATENT DOCUMENTS

| | | | | |
|---|---|---|---|---|
| 3,696,839 A * | 10/1972 | Irie | ........................ | F16K 11/07 |
| | | | | 137/625.61 |
| 4,245,671 A * | 1/1981 | Kosugui | ............. | F15B 13/0431 |
| | | | | 137/625.6 |
| 5,070,898 A * | 12/1991 | Jagodzinski | ........ | F15B 13/0438 |
| | | | | 137/82 |
| 5,133,386 A * | 7/1992 | Magee | ................ | F15B 13/0438 |
| | | | | 137/625.2 |
| 5,913,810 A * | 6/1999 | Andre | ..................... | F15B 13/01 |
| | | | | 60/420 |
| 6,182,697 B1 * | 2/2001 | Parker | ..................... | F15B 13/01 |
| | | | | 137/625.16 |
| RE38,355 E * | 12/2003 | Sandau | ............... | F15B 13/0402 |
| | | | | 60/452 |
| 8,857,036 B2 * | 10/2014 | Kuebel | ................ | F16L 13/147 |
| | | | | 29/523 |
| 10,786,879 B2 * | 9/2020 | Sawicki | ................... | B23P 19/02 |
| 2003/0140974 A1 | 7/2003 | Suilmann et al. | | |
| 2016/0228889 A1 * | 8/2016 | Maruyama | .......... | F16K 31/0672 |
| 2017/0068254 A1 * | 3/2017 | Hero | ........................ | F16K 17/26 |
| 2018/0372128 A1 * | 12/2018 | Jaskiewicz | ............ | F16K 31/004 |
| 2019/0085870 A1 * | 3/2019 | Wang | ................... | F15B 13/0436 |
| 2020/0166059 A1 * | 5/2020 | Bujewicz | ............ | F15B 13/0438 |

\* cited by examiner

SERVO VALVE

FOREIGN PRIORITY

This application claims priority to European Patent Application No. 18461633.2 filed Nov. 27, 2018, the entire contents of which is incorporated herein by reference.

TECHNICAL AREA

The present disclosure relates to servo valves, and in particular spool servo valves. Such spool valves are often used in hydraulic systems for aerospace applications.

BACKGROUND

Servo valves are well-known in the art and can be used to control the flow of fluid, for example hydraulic fluid to an actuator or fuel flow to a combustor. Typically, a flapper is deflected by an armature connected to an electric motor away or towards nozzles, which control fluid flow to the spool valve. Deflection of the flapper can control the amount of fluid injected from the nozzles, and thus the amount of fluid communicated to the actuator via the spool valve. In this way, servo valves can allow precise control of actuator movement.

SUMMARY

According to an aspect of the present disclosure, there is a servo valve comprising a valve housing, a cavity formed in the valve housing and defining a longitudinal axis, a member disposed in the cavity and axially and rotationally moveable therein, along and about said longitudinal axis respectively, wherein the member comprises first and second sections having first and second cross-sectional areas, a central section located between the first and second sections and having a third cross-sectional area smaller than both the first and second cross-sectional areas, and first and second transition sections respectively between the first and second sections and the central section, and forming respective first and second outer surfaces angled relative to the axis, wherein at least one of the transition sections comprises a non-circular cross-section having a concave portion forming at least part of the respective first and second surfaces, a channel is defined radially between the member and the valve housing, and bounded by the first and second sections, the valve housing comprises a plurality of ports, each forming a fluid passage through the valve housing in fluid communication with the channel, the plurality of ports comprising first and second ports each defining a diameter and having first and second nozzles with first and second nozzle openings for providing fluid communication between the channel and a spool, the first and second nozzle openings each having diameters smaller than the diameter of their respective port, wherein, in a first axial position of the member the second nozzle opening is at least substantially obstructed by the second surface and the first nozzle opening is at least substantially unobstructed by the first surface, and in a second axial position of the member the first nozzle opening is at least substantially obstructed by the first surface and the second nozzle opening is at least substantially unobstructed by the second surface, wherein the concave portion is at least partially aligned with and faces the respective first or second nozzle opening such that rotating the member in said cavity varies the level of obstruction of the first or second nozzle openings in the second or first axial positions respectively.

In an embodiment, the depth of the concave portion varies along its circumference.

In a further embodiment of any of the above, the depth of the concave portion is greatest at a midpoint along its circumference.

In a further embodiment of any of the above, the concave portion extends along the full length of the transition section.

In a further embodiment of any of the above, the concave portion extends around more than 15 degrees of the member.

In a further embodiment of any of the above, the concave portion extends around more than 30 degrees of the member.

In a further embodiment of any of the above, the concave portion extends around more than 45 degrees of the member.

In a further embodiment of any of the above, each of the first and second transition sections comprises a respective concave portion.

In a further embodiment of any of the above, the respective concave portions are circumferentially separated from each other.

In a further embodiment of any of the above, the servo valve further comprises a piezoelectric actuator configured to move the member relative to the valve housing, between said first and second axial positions.

The piezoelectric actuator may be secured to the valve housing and secured to the member so as to actuate axial movement of the member relative to the valve housing.

The term 'secured' should be understood to mean that the two (or more) parts in question may be directly or indirectly secured together. When the two parts are indirectly secured together, one or more intervening members will be positioned therebetween.

In a further embodiment of any of the above, the piezoelectric actuator comprises a piezoelectric stack and a frame, the piezoelectric stack is attached to the frame at a first pair of opposed attachment points arranged perpendicular to the axis, and the member and the valve housing are attached to the frame at a second pair of opposed attachment points.

In a further embodiment of any of the above, the actuator is arranged outside the valve housing and secured to the valve housing at an axial end thereof by a bracket.

In a further embodiment of any of the above, the servo valve further comprises a cover secured to the valve housing and comprising an axially-extending portion extending axially beyond the piezoelectric actuator and a radially-extending portion.

In a further embodiment of any of the above, the servo valve further comprises an electrical connection extending from the piezoelectric actuator and through an opening in the cover, the electrical connection configured for connection to an external power source and a seal disposed proximate the opening to sealingly engage the electrical connection and the cover.

In a further embodiment of any of the above, the cavity defines a cross-section with a constant radial size and the first and second sections of the member are slideably engaged to the valve housing within the cavity.

In a further embodiment of any of the above, the cavity cross-section and the first and second cross-sectional areas of the first and second sections are circular.

In a further embodiment of any of the above, the servo valve further comprises an O-ring seal disposed around the second section of the member to sealingly engage the member and the valve housing.

In a further embodiment of any of the above, the plurality of ports comprises a third port located axially between the first and second ports.

In a further embodiment of any of the above, one or more of the ports comprises a screen filter.

In a further embodiment of any of the above, the valve is a fuel supply valve.

In a further embodiment of any of the above, the valve is a pneumatic control valve.

In a further embodiment of any of the above, the plurality of ports extend substantially perpendicularly to the longitudinal axis.

In a further embodiment of any of the above, the plurality of ports extend substantially parallel to each other.

In a further embodiment of any of the above, the servo valve further comprises a spool in fluid communication with at least one of the plurality of ports for controlling fluid flow to a component.

According to another aspect of the present disclosure, there is an assembly comprising the servo valve of any of the above and a component in fluid communication with the spool.

According to another aspect of the present disclosure, there is a method of repairing a valve system comprising removing an existing servo valve and fitting the servo valve of any of the above.

According to another aspect of the present disclosure, there is a method of assembling a servo valve, the method comprising providing a cavity in a valve housing, the cavity defining a longitudinal axis and the valve housing comprising a plurality of ports, each forming a fluid passage through the valve housing, assembling a member in the cavity, the member comprising first and second sections having first and second cross-sectional areas, a central section located between the first and second sections and having a third cross-sectional area smaller than both the first and second cross-sectional areas, and first and second transition sections respectively between the first and second sections and the central section and forming respective first and second surfaces angled relative to the axis, wherein at least one of the transition sections comprises a non-circular cross-section having a concave portion forming at least part of the respective first and second surfaces, and a channel is defined radially between the member and the valve housing, and bounded by the first and second sections; assembling first and second nozzles having first and second nozzle openings in first and second ports of the plurality of ports such that the concave portion is at least partially aligned with and faces the respective first or second nozzle opening; varying a radial position of the first and second nozzles to vary the spacing between the first and second nozzle openings and the first and second surfaces respectively; and rotating the member about the axis to vary the spacing between the first and/or second surface of the respective first and/or second transition sections and the respective first and/or second nozzle openings.

In a further embodiment of the above, the step of rotating the member about the axis is performed after the step of varying a radial position of the first and second nozzles such that the rotating step provides a finer calibration of the spacing between the first and second nozzle openings and the first and second surfaces respectively.

DETAILED DESCRIPTION

Figure 1:
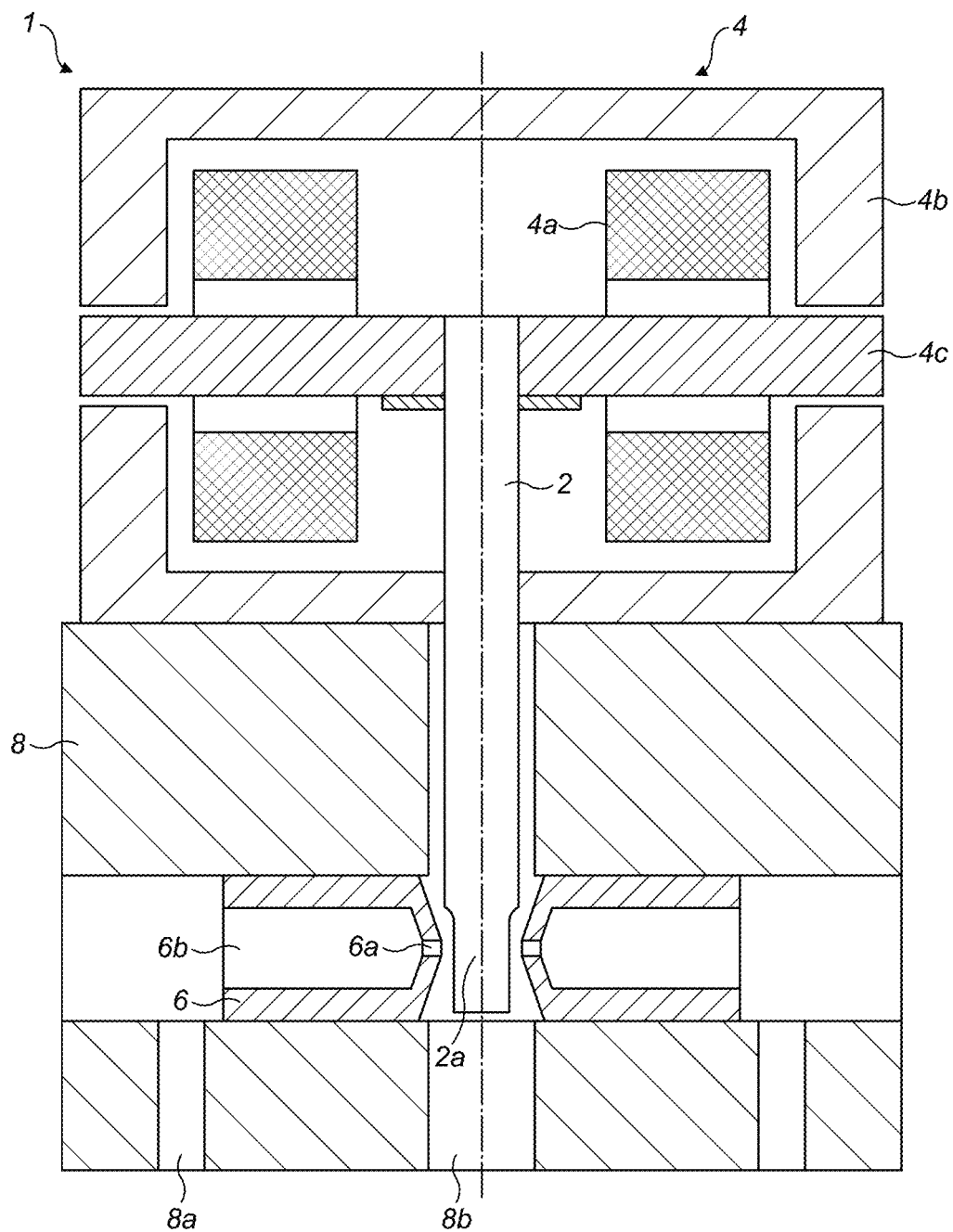
FIG. 1 shows a prior art servo valve.

With reference to FIG. 1, a prior art servo valve 1 is illustrated. Servo valve 1 comprises an electric motor 4, flapper 2, nozzles 6 and nozzle housing 8. The electric motor 4 comprises coils 4a, permanent magnets 4b and armature 4c. The coils 4a are in electrical communication with an electrical supply (not shown) and when activated, interact with the permanent magnets 4b to create movement of armature 4c, as is well-known in the art. Flapper 2 is attached to armature 4c, and is deflected by movement of the armature 4c. Nozzles 6 are housed within nozzle housing 8 via an interference fit and comprise a fluid outlet 6a and fluid inlet 6b. Housing 8 also has a port 8a, which allows communication of fluid to the nozzles 6.

The flapper 2 comprises a blocking element 2a at an end thereof which interacts with fluid outlets 6a of nozzles 6 to provide metering of fluid from the fluid outlets 6a to a fluid port 8b in the housing 8, which allows communication of metered fluid from the nozzles 6 to an actuator via a spool valve input (not shown). As is known in the art, the electric motor 4 is used to control deflection of the blocking element 2a and vary the fluid delivered to the actuator from nozzles 6, as required.

Figure 2:
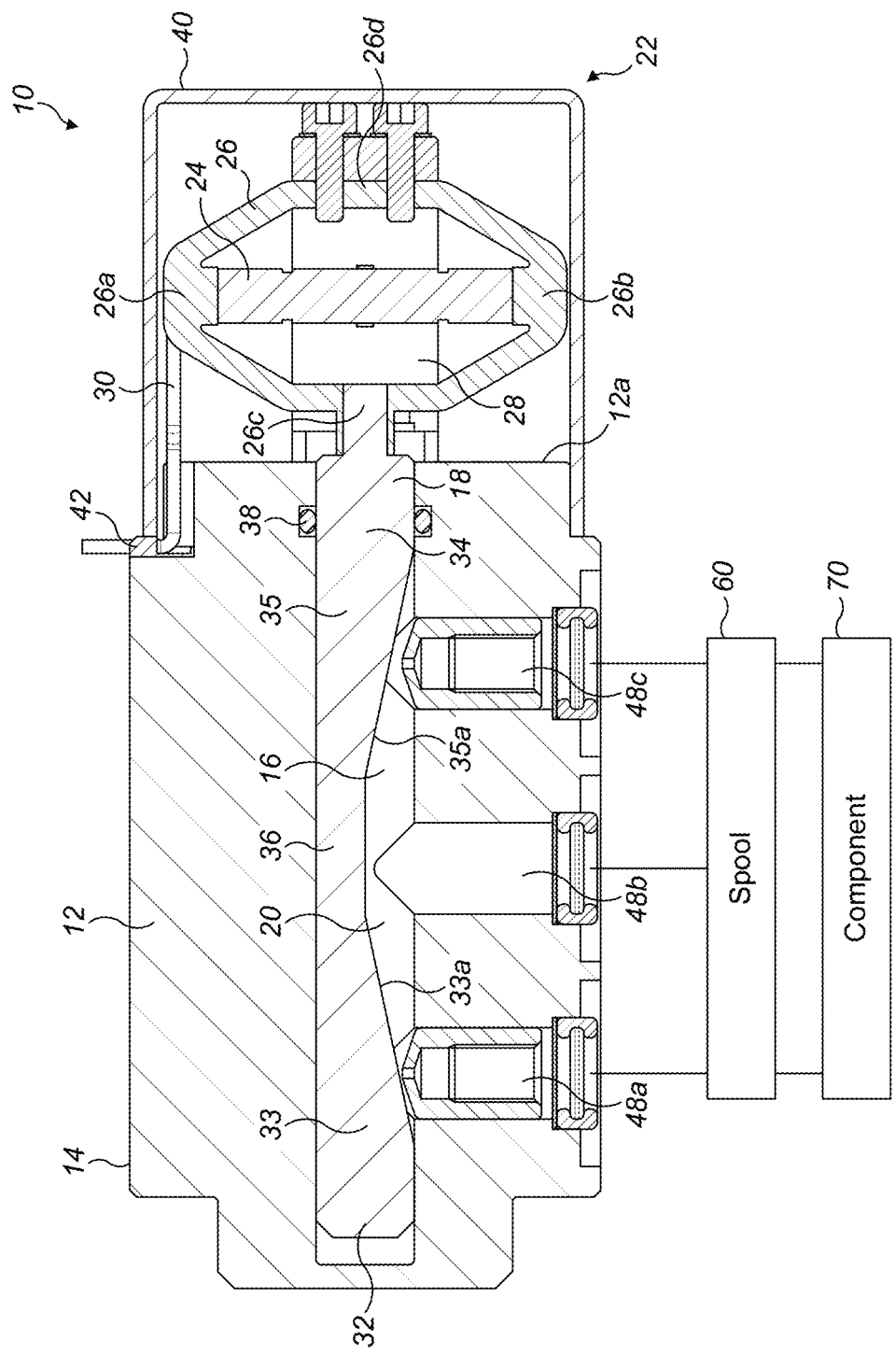
FIG. 2 shows a cutaway view of a servo valve assembly in accordance with the present disclosure.
Figure 3:
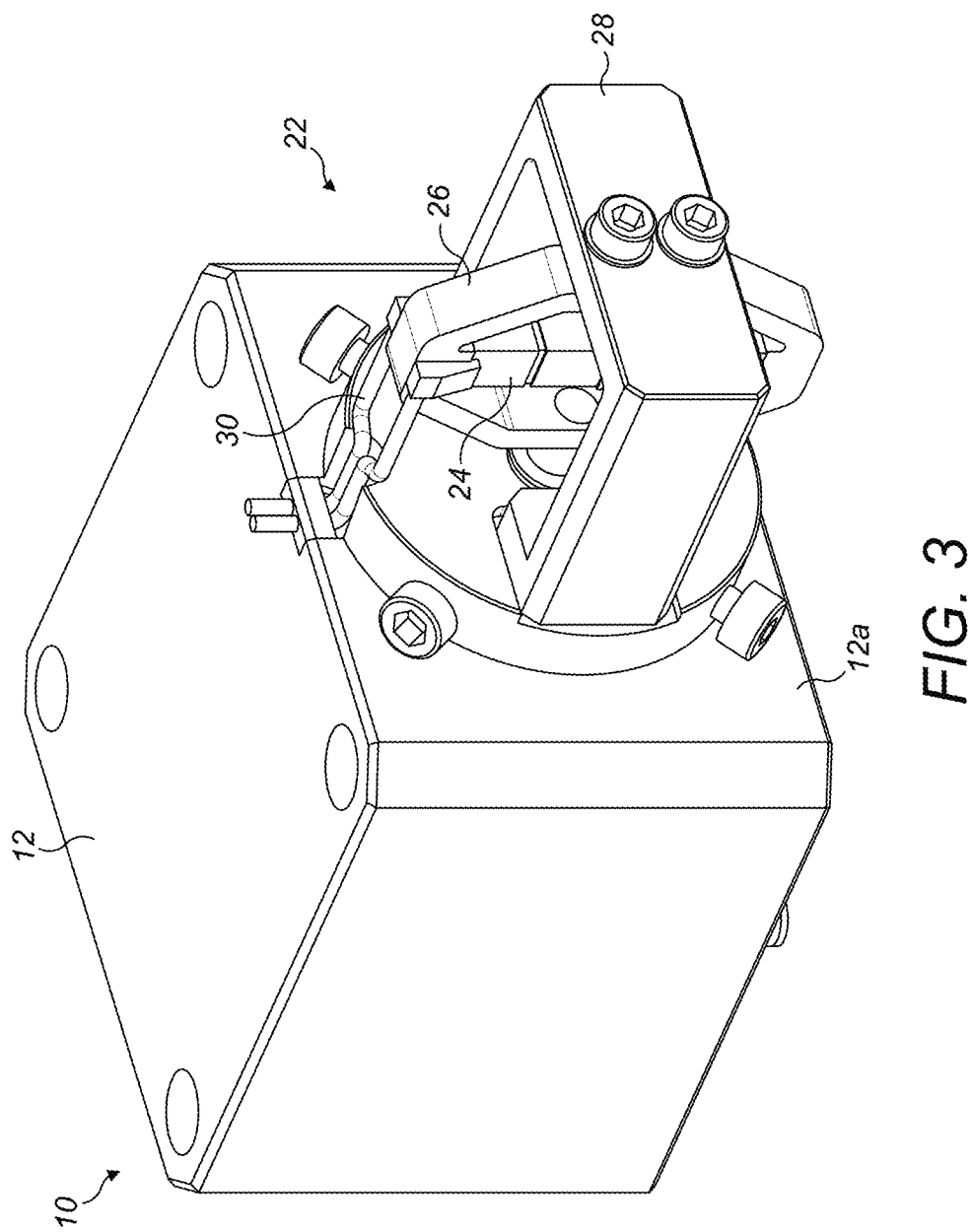
FIG. 3 shows a perspective view of the servo valve of FIG. 2.

FIGS. 2 to 7 illustrate a servo valve 10 in accordance with the present disclosure. FIG. 2 also shows, in a schematic manner, a spool 60 driveably connected to the servo valve 10 and a component 70 controlled by the position of the spool 60. The component 70 may be an actuator.

The valve comprises a valve housing 12 with an outer surface 14 and a cavity 16, the cavity 16 defining a longitudinal axis X through the valve housing 12. The valve housing 12 has first and second axial ends 12a, 12b, and the cavity 16 forms an opening 16a in the outer surface 14 at the first axial end 12a.

An elongated member (or 'rod') 18 is disposed predominantly in the cavity 16, extending along the axis X. The member 18 is shaped so as to form a channel 20 in the cavity 16, as will be described in further detail below.

An actuator 22 is secured to the outer surface 14 of the valve housing 12 at the first end 12a, and to an end 18a of the member 18. The actuator is configured to induce axial movement of the member 18 proportional to an electrical signal received through an electrical connection 30. In the embodiment shown, the actuator 22 is a piezoelectric actuator. In other embodiments, the actuator 22 could be of another type, for example a solenoid and spring.

Figure 4:
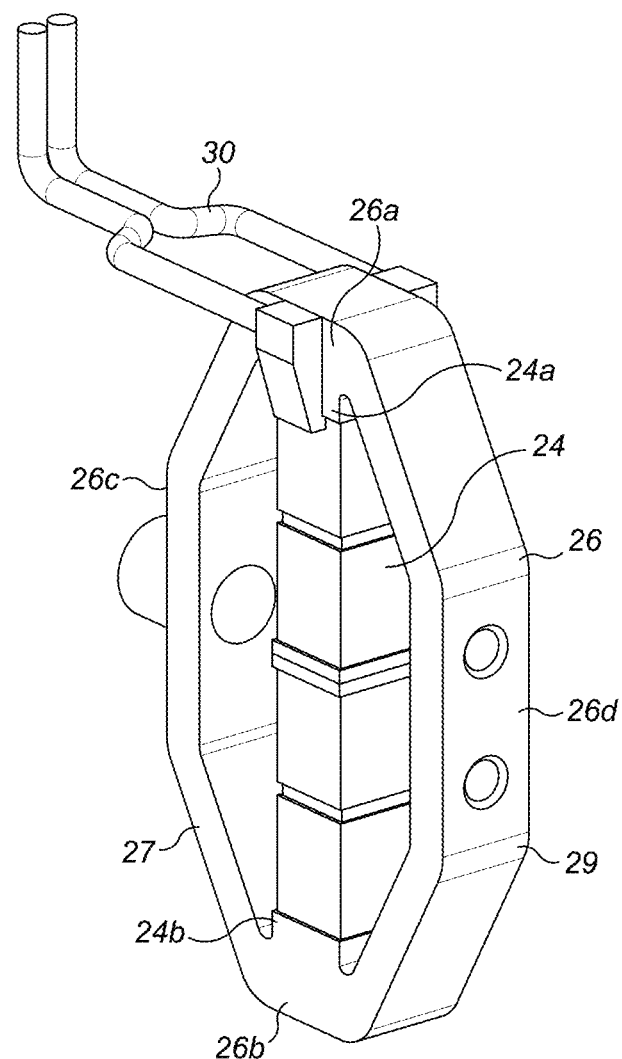
FIG. 4 shows an isolated perspective view of a piezoelectric actuator portion of the servo valve of FIG. 2.

The piezoelectric actuator 22 is secured to the outer surface 14 by a bracket 28. In the embodiment shown, the piezoelectric actuator 22 comprises a piezoelectric stack 24 and a frame 26, as best seen in FIG. 4. The electrical connection 30 connects the piezoelectric stack 24 to an electrical power source (not shown).

The frame 26 comprises a plurality of attachment points 26a-d for other components. In the embodiment shown, the attachment points forms sides of a generally octagonal frame; however, it is to be understood that the attachment points could instead be on vertices of a quadrangular frame without affecting the general function of the frame.

The piezoelectric stack 24 is arranged within the frame 26, generally perpendicular to the longitudinal axis X. Pair of ends 24a, 24b of the piezoelectric stack 24 are fixed to the frame 26 at a first pair of attachment points 26a, 26b forming sides of the frame 26. The first pair of attachment points 26a, 26b are opposing sides of the frame 26, arranged generally in line with each other in a direction perpendicular to the axis X.

Second pair of attachment points 26c, 26d form a second pair of opposing sides of the frame 26. The second pair of attachment points 26c, 26d are arranged generally in line with each other in the direction of the axis X. One of the second pair of attachment points 26c fixedly attaches the frame 26 to the end 18a of the member 18, thereby securing the actuator 22 to the member 18. The other of the second pair of attachment points 26d fixedly attaches the frame 26 to the bracket 28, thereby securing the actuator 22 to the valve housing 12.

The attachment points 26a-d are connected to each other via four connecting sides 27a-d of the frame. Each of the sides of the frame 28 are joined to adjacent sides at flexible joints 29 which allow relative angular movement of the adjacent sides.

The attachments between respective components and sides may be by any known means. For example, the frame 26 is connected to the bracket 28 by a pair of washer and screw connections. The frame 26 may be attached to the end 18a of the member 18 by soldering or by gluing, for example.

The piezoelectric stack 24 is formed of a known piezoelectric material. An electric signal is provided to the stack 24 from the power source via the connection 30. The electrical signal results in a change of dimension, either an expansion or contraction, of the stack 24 in the direction perpendicular to the longitudinal axis X in which the stack 24 is arranged.

Any type of material exhibiting piezoelectric behaviour might be used to form the piezoelectric stack 24, for example synthetic crystals such as langasite, gallium orthophosphate, lithium niobate or lithium tantalite; or synthetic ceramics such as barium titanate, lead zirconate titanate, potassium niobate, sodium tunstate or zinc oxide. Synthetic ceramics may be used in particular to provide resistance to high temperatures, such as those frequently encountered in aerospace applications.

As the ends 24a, 24b of the stack 24 are attached to the first pair of sides 26a, 26b of the frame 26, the movement of the stack 24 produces a corresponding relative movement of the first pair of sides 26a, 26b either contracting towards or expanding apart from each other. As adjacent ones of the sides are joined at flexible joints, movement of the first pair of sides 26a, 26b results in a distortion of the frame 28. Hence, expansion of the first pair of sides 26a, 26b results in a contraction of the second pair of sides 26c, 26d along the axis X, and a contraction of the first pair of sides 26a, 26b similarly results in an expansion of the second pair of sides 26c, 26d along the axis X.

As the second pair of sides 26c, 26d are secured to the member 18 and housing 12, a relative expansion or contraction of the second pair of sides 26c, 26d in turn results in relative movement of the member 18 within the housing 12. Hence, it can be seen that applying an electrical signal to the piezoelectric stack 24 allows the actuator 22 to control an axial displacement of the member 18 in the cavity 16 of the housing 12.

The expansion and contraction of the piezoelectric stack 24 is proportional to the voltage/current applied thereto. Hence, the electrical signal can precisely control the change in dimensions of the piezoelectric stack 24, and thereby the degree of movement of the member 18 within the cavity 16.

A generally elliptical shape formed by the frame arrangement can provide an amplification of the displacement of the piezoelectric stack 24, increasing the movement experienced by the member 18 at a given electric signal. That is, the structural arrangement of the frame 26 is such that a given displacement of the piezoelectric stack 24 results in a larger displacement of the member 18, due to the separation between the first pair of attachment points 26a, 26b being greater than the separation between the second pair of attachment points 26c, 26d. The amplification effect is increased by increasing the ratio between separation of the first pair of sides 26a, 26b relative to the separation of the second pair of sides 26c, 26d (as measured in an un-electrified state of the piezoelectric stack 24). The amplification ratio of the frame 26, measured as the ratio of member displacement to piezoelectric displacement can be between 2 to 20, for example 10.

In other embodiments (not shown) where the actuator is a solenoid, a portion of the member is arranged within a solenoid arranged along the axis. The member is formed of a ferromagnetic material. When the solenoid is powered, it exerts an axial force on the member and induces a resultant axial movement of the member. A spring is arranged at the end of the member, such that when the solenoid is depowered, the member is returned to the original axial position. As with the piezoelectric actuator, the force induced by the solenoid is proportional to an electrical signal provided to the solenoid, and the degree of axial movement can therefore be precisely controlled. An example of a solenoid actuator used in this way can be seen in EP patent application number 18461587.0 filed 20 Jul. 2018.

Figure 5:
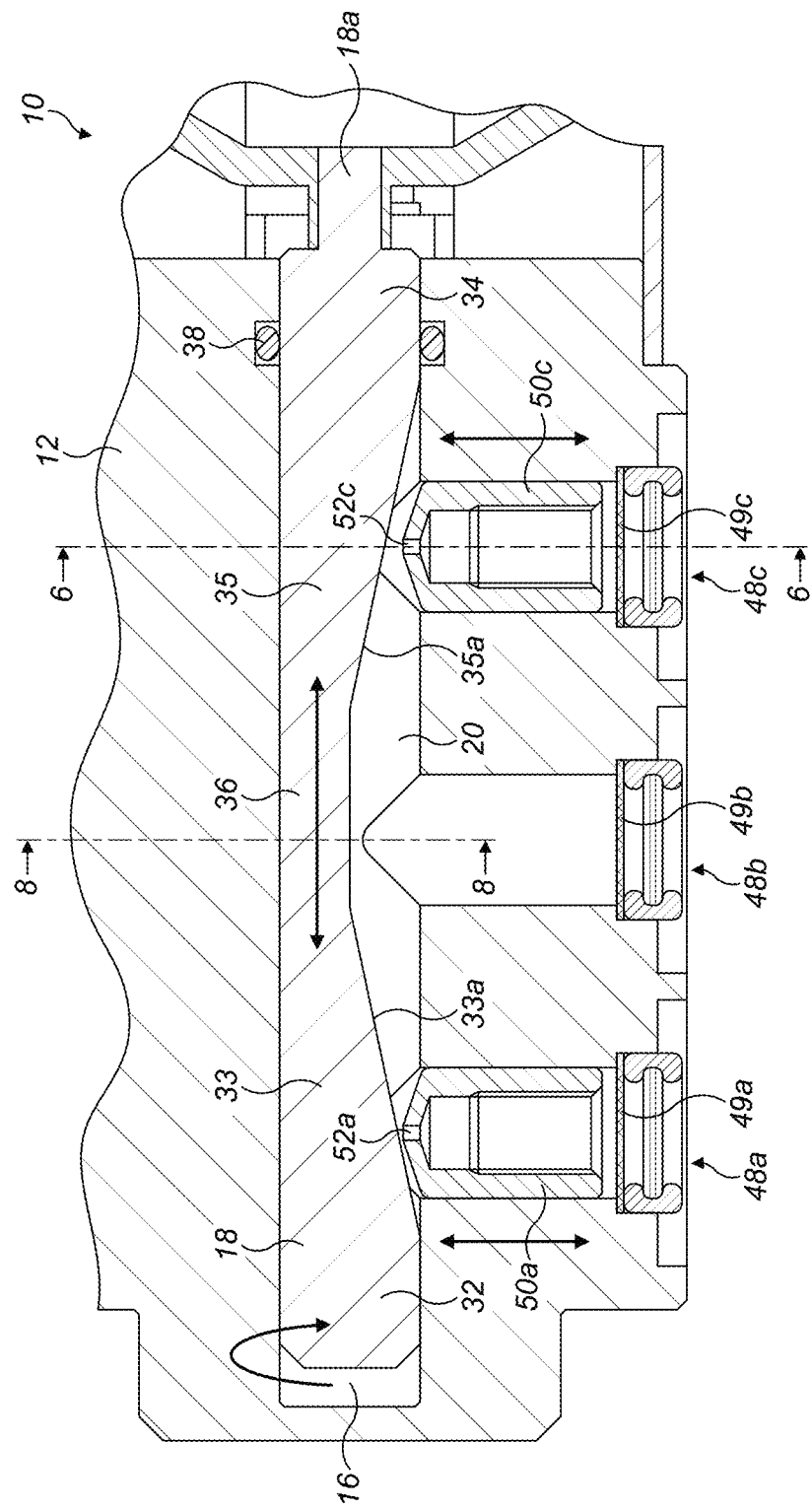
FIG. 5 shows a cutaway view of a portion of the servo valve of FIG. 2.
Figure 8:
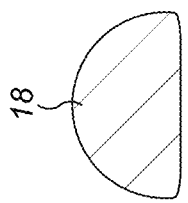
FIG. 8 shows a cutaway isolation view of the valve taken along the line 8-8 shown in FIG. 5.

As shown in FIGS. 2 and 5, the member 18 inside the cavity 16 comprises notional first and second end sections 32, 34, and a third, middle section 36 arranged between the first and second end sections 32, 34. The first and second end sections 32, 34 have first and second cross-sectional areas which are generally constant along the longitudinal axis X. In the embodiment shown, the first and second cross-sectional areas are the same size. Each of the first and second end sections 32, 34 are cylindrical, having a circular cross section, so as to allow rotation of the member 18 within the cavity 16, for reasons which will be described in more detail below. The third section 36 has a third cross-sectional area, also generally constant along the axis X, in this example, roughly semi-circular (with the partially circumferential surface adjacent the inner surface of the valve housing 12), as shown in FIG. 8. The third cross-sectional area is smaller than both of the first and second cross-sectional areas.

The first and second sections 32, 34 are connected to the third section 36 by respective transition sections 33, 35, which have cross-sectional areas which vary along the axis X (for example, linearly) from the first or second cross-sectional areas adjacent the first or second section 32, 34 to the third cross-sectional area adjacent the third section 36.

The transition sections 33, 35 thereby form first and second sloped or angled surfaces 33a, 35a on the member 18 which are non-parallel with the axis X. The angled surfaces 33a, 35a are further shaped to provide calibrated metering of a flow, as will be described in more detail below.

The cavity 16 has a cross-sectional size only slightly larger than that of the first and second cross-sectional areas, and has a circular cross-section to correspond with that of the first and second sections 32, 34. The member 18 therefore has a sliding, sealing fit within the cavity 16. The reduced cross-sectional area in the third section 36 therefore forms a channel 20 within the cavity 16, bounded by the seals formed by the first and second end sections 32, 34. In the embodiment shown, the channel 20 is a generally trapezoidal cutaway shape, defined by the inner surface of the valve housing 12, the sloped surfaces 33a, 35b and a surface 36a of the third section 36.

As best seen in FIG. 5, ports 48A, 48B, 48C are formed in the valve housing 12 and extend fully between the outer surface 14 of the valve housing 12 and the cavity 16. The ports 48A, 48B, 48C thereby provide a means of fluid communication into the valve housing 12 from the outer surface 14 to the cavity 16. Respective openings of the ports 48A, 48B, 48C are located in the cavity 16.

The member 18 is situated in the cavity 16 such that the openings of the ports 48A, 48B, 48C are located axially between the first and second sections 32, 34 of the member 18. The openings of the ports 48A, 48B, 48C are therefore in fluid communication with the channel 20 formed by the member 18.

The ports comprise a supply port 48A, a control port 48B and a return port 48C. The supply port 48A is linked to a supply of fluid (not shown) to communicate fluid from the supply to the channel 20. The control port 48B is linked to a downstream component, to communicate fluid from the annular channel to the downstream component. The return port 48C operates to return fluid to a supply or atmosphere.

The supply port 48A and the return port 48C comprise respective nozzles 50A, 50C, having respective nozzle openings 52A, 52C. In the first axial position of the member 18 (not shown), the return port nozzle opening 52C is proximate the second sloped surface 35a, which substantially or fully obstructs the nozzle opening 52C. The engagement may fluidly seal the nozzle opening 52C. In the first axial position, the supply port nozzle opening 52A is substantially or fully unobstructed, because the first sloped surface 33a is axially spaced from the supply port nozzle opening 52A in a direction away from the return port nozzle opening 52C.

As the member 18 is moved from the first axial position partially towards the second axial position (shown in FIGS. 2 and 5) by the actuator 22 as described above, the second sloped surface 35a moves axially relative to the return port nozzle opening 52C, such that the second sloped surface 35a is further from the return port nozzle opening 52C in a direction away from the supply port nozzle opening 52A, and only partially obstructs the return port nozzle opening 52C, obstructing the return port nozzle opening 52C to a lesser extent than in the first axial position. As such, a partial fluid flow is allowed through the nozzle opening 52C, although the fluid flow is less than if the nozzle opening 52C were substantially or fully unobstructed.

At the same time, the first sloped surface 33a partially engages the supply port nozzle opening 52A in a similar manner as described above, preventing some of the fluid flow therethrough.

As the member 18 moves further from the first axial position fully towards the second axial position, the second sloped surface 35a moves further from the return port nozzle opening 52C such that fluid may flow through substantially or fully unobstructed. At the second axial position, the first sloped surface 33a is proximate the supply port nozzle opening 52A and substantially or fully prevents any fluid flow therethrough.

The control port 48B is at least substantially unobstructed independent of the axial position of the member 26.

The operation described above allows the control of fluid through the respective ports 48A, 48B, 48C by controlling an axial position of the member 18 using the piezoelectric actuator 22. As described above, the member 18 can be moved, in a continuous manner, to any axial position between the first and second axial positions; hence, fluid flow through the ports 48A, 48B, 48C can be controlled to provide partial flow through the supply and/or return ports 48A, 48C.

The described valve provides a means for selectively controlling fluid flow using a desirably simplified construction. For example, a one-piece member may be used to reduce the connections required between parts.

The simple construction of the present disclosure also reduces the need to cut air gaps between components.

The member 18 of the present arrangement fulfils the role of the flapper of the prior-art valve; however, by comparison, the member 18 of the present valve 10 requires relatively little calibration.

The use of a piezoelectric actuator 22 fulfils both the function of fixing the member 18 in place relative to the housing 12, and of moving the member 18. Additionally, the piezoelectric actuator 22 provides bidirectional axial movement with a single component, as opposed to more complex prior art arrangements using a pair of magnets or cooperational arrangement of magnets and springs. Finally, the use of a piezoelectric actuator 22 removes the need for permanent or solenoid magnetisation, as in said prior art arrangements.

In order to fully control the fluid flow through the ports 48A, 48B, 48C, it is necessary to calibrate the valve 10 such that particular axial positions of the member 18 results in a known degree of fluid flow through the ports 48A, 48B, 48C. Calibration can be performed by varying an axial positioning of the member 18 within the cavity 16 and measuring fluid flow, but this method can be inaccurate. By way of example, inaccuracies in calibration may be induced by 'slip-stick' errors. Such errors occur where friction between the member 18 and the housing 12 causes the member 18 to 'stick' to the walls of the cavity 16 and remain stationary when the member 18 is subject to an axial force from the actuator 22, then to suddenly 'slip' at a slightly larger force, resulting in a disproportionately large axial movement of the member 18 and an inaccurate calibration reading.

An improved method of calibration can be performed in a two-stage process.

Assembly of the valve initially includes attaching the member 18 to the piezoelectric actuator frame 26, for example by welding, gluing or soldering. Once so attached, the member 18 is inserted into the valve housing 12 by sliding. The frame 26 is then secured to the housing via the bracket 28 so that the actuator 22 is attached to the valve housing 12. This step is performed, for example, by screwing the bracket 28 to the housing 12.

Following this step, the nozzles 50A, 50C are inserted into respective supply and return ports 48A and 48C in a radial direction. The position of the nozzles 50A, 50B is maintained by the structure of the ports 48A, 48C and nozzles 50A, 50C, for example by a press fit.

The radial position of the nozzles 50A, 50C in the return ports 48A, 48C can be selected to provide an initial calibration of the valve 10. Variation in the radial position of the nozzles 50A, 50C controls a separation of the nozzle openings 52A, 52C from the angled surfaces 33a, 35a of the transition sections 33, 35 for a given axial position of the member 18. The separation of the openings 52A, 52C from the surfaces 33a, 35a in turn determines how much the member 18 obstructs, partially obstructs, or does not obstruct the nozzle openings 52A, 52C at the given axial position of the member 18. Hence, the radial position of the nozzles 50A, 50C in the ports 48A, 48C affects the amount of fluid flow at the given axial position of the member 18, and can be selected in order to calibrate the fluid flow through the ports 48A, 48C.

In order to place the nozzles 50A, 50C in a required radial position, the insertion of the nozzles 50A, 50C may be preceded by measuring the depth of the ports 48A, 48C from the outer surface 14 of the housing 12 to the first and second sloped surfaces 33a, 35a of the member 18, for example by using a laser sensor. The nozzles 50A, 50C are then inserted, and the depth (or protrusion) of radially lower ends of the nozzles 50A, 50C in the ports 48A, 48C is similarly measured. By using a known radial length of the nozzles 50A, 50C, the separation between the ports 52A, 52C and the sloped surfaces 33a, 35b can be approximately calculated.

Figure 7:
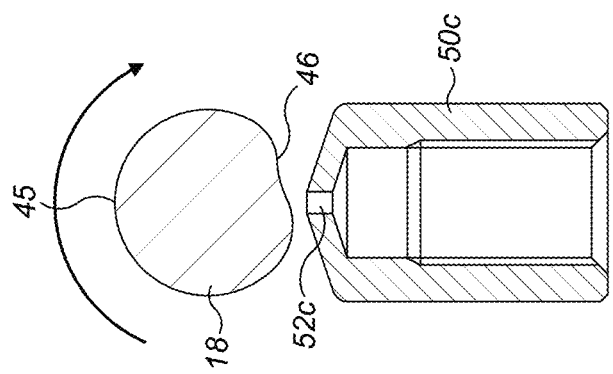
FIG. 7 shows a cutaway isolation view of the member and nozzle of FIG. 6.
Figure 6:
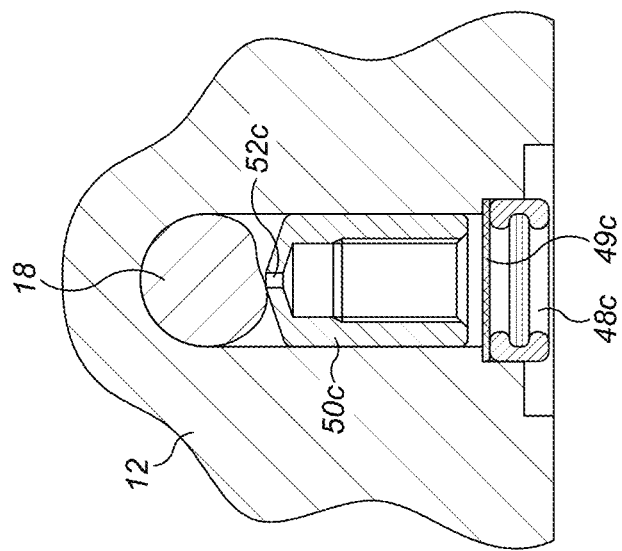
FIG. 6 shows a cutaway view of the valve taken along the line 6-6 shown in FIG. 5.

This initial calibration can be performed to obtain an initial approximation of the parameters required for function of the valve 10. Following the initial calibration step, a more precise calibration can be performed, as described below and as best seen in FIGS. 5 to 7.

In order to allow a more precise calibration of the member 18, one or both of the transition sections 33, 35 has a non-circular cross-section comprising an indented or concave portion 46. The concave portion 46 forms part of the respective angled surfaces 33a, 35a which may otherwise be circumferential (i.e. follow a circular path). In the embodiment shown, the non-circular cross-section comprises a circular segment 45 and a non-circular segment, where the non-circular segment comprises a rounded concavity forming the concave portion 46. The concave portion 46 is located so as to be aligned with and face the respective nozzle opening 52a, 52b.

In the example shown, the concave portion 46 extends for the full length of the transition sections 33, 35, but in other embodiments (not shown) it may only extend for the portion of the transition sections 33, 35 that would be likely to be aligned with the nozzle openings 52a, 52b in use.

As described above, the transition sections 33, 35 have cross-sections of varying areas along their axial lengths. In the embodiment shown, the cross-sectional shape of the transition sections 33, 35 also changes as it moves from the substantially circular cross-section first and second sections 32, 34 to the substantially semi-circular shape of the central section 36 (as shown in FIG. 8). In other words, the concave portion 46 increases in size (relative to the rest of the cross-sectional area of the transition section 33, 35 at that axial position) towards the middle of the member 48. However, in other embodiments (not shown), the transition sections 33, 35 may still have cross-sections of a consistent shape throughout their length, with only the size of cross-section varying. In other words, the shape of the concave portion 46 may remain the same along the length.

At an axial location of the member which is configured to align with the ports 52A, 52B, the concave portion 46 may extend around more than 15 degrees of the circumference of the member 18, measured between two radially outer points of the concavity. For example, the concave portion may extend around at least 45 degrees of the circumference of the member 18.

A rotational position of the member 18 can be selected to provide a precise calibration of the valve 10. The transition sections 33, 35 do not have non-circular cross-sections, and so do not have circular symmetry about the longitudinal axis X; that is, the transition sections 33, 35 can be rotated through an angle to present a different shape. As the angled surfaces 33a, 35a of the transition surfaces 33, 35 are formed by non-circular segments of the transition section cross-sections (i.e. a concave portion of the outer surface), rotation of the member 18 about the axis X changes the shape of the surfaces 33a, 35a which is presented to the nozzle openings 52A, 52C. This change in shape affects the degree to which the nozzle openings 52A, 52C are obstructed, partially obstructed, or not obstructed by the surfaces 33a, 35a. The rotational position of the member 18 therefore affects the fluid flow, and can be selected in order to calibrate the fluid flow through the ports 48A, 48C for a given axial position of the member 18.

In the embodiment shown, both transition sections 33, 35 comprise a concave portion 46. However, in other embodiments, only one of the two transition sections 33, 35 may comprise such a concave portion 33, 35. The concave portion 46 may be the same shape on both transition sections 33, 35, or the transition sections 33, 35 may comprise differently shaped, sized or positioned concave portions 46.

Figure 9:
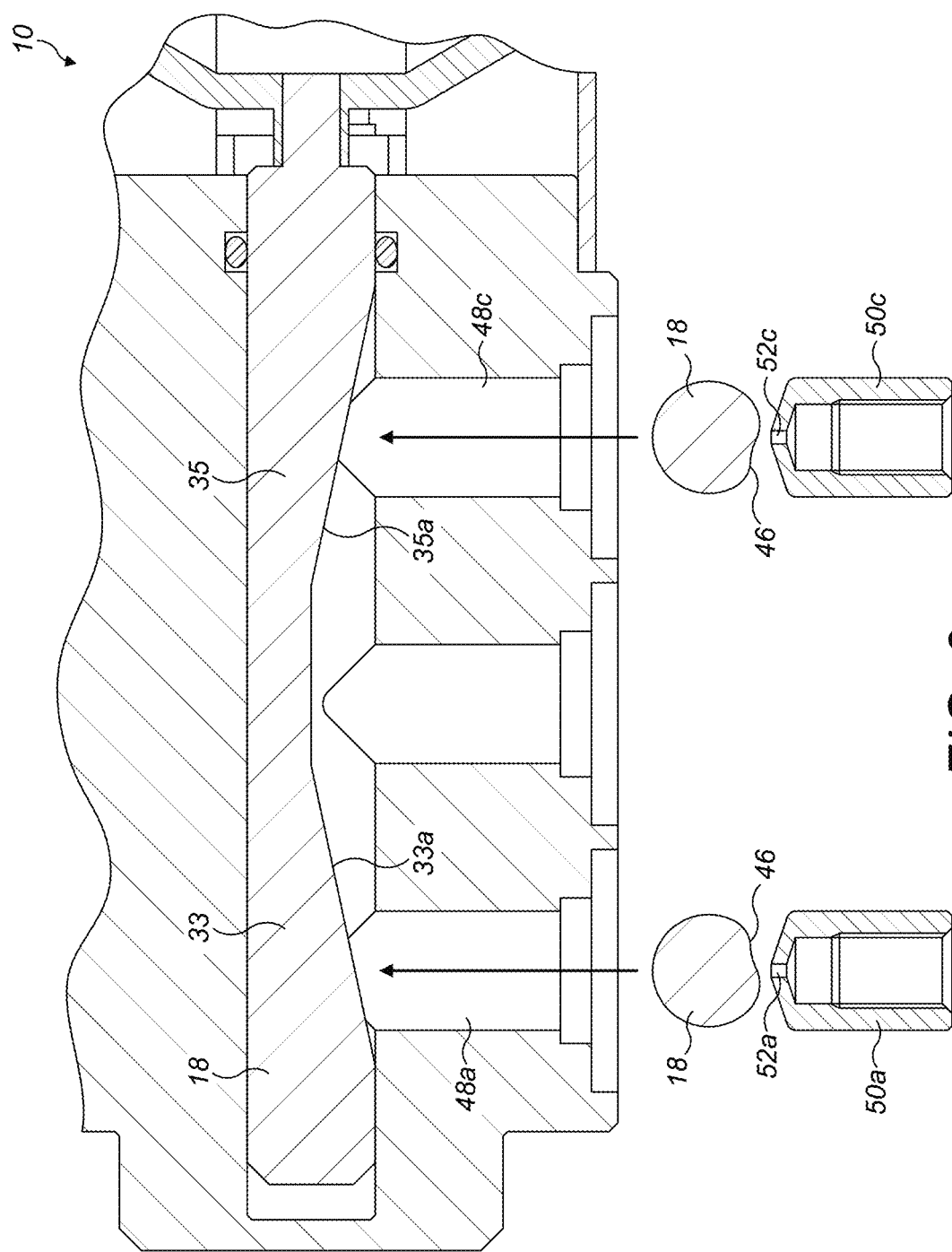
FIG. 9 shows a cutaway view of the servo valve of FIG. 2, with further cutaway isolation views.

In the embodiment shown, and as best seen in FIG. 9, the transition sections 33, 35 comprise respective similarly shaped and sized concave portions 46, but which are circumferentially separated from each other with respect to the axis. That is, the concave portions 46 are not aligned with each other along the axis X. For example, the concave sections may be circumferentially separated by more than 15 degrees, or by more than 60 degrees, the separation being measured from respective midpoints of the concave portions 46. The circumferential separation of the concave portions of the transitions sections 33, 35 means that, when the member 18 is rotated, the changes in obstruction of the ports 52A, 52C by the sloped surfaces 33a, 35a are different to each other. This may provide a more effective calibration of the member 18.

The position of the circumferentially separated concave portions 46 on the member 18 may be such that, when the member 18 is positioned in the cavity 16 prior to the calibration step, the concave portions 46 are symmetrically opposed about a plane passing through the radial axes of the ports 50A, 50B, 50C. That is, when the member 18 is viewed along the axis X, the concave portions 46 are circumferentially spaced to either side of a radial axis defined by any of the ports 50A, 50B, 50C by the same angle as each other. This position of the concave portions 46 may provide a more easily calibrated valve arrangement.

During the precise calibration of the valve 10, the valve 10 is positioned on a test bed. Test flows through the valve 10 are compared to known currents provided to the actuator 22 in order to evaluate the valve 10. The member 18 can then be rotated about the axis X within the cavity 16, for example by loosening the screwed attachment of the bracket 28 to the housing 12 and rotating the bracket (along with the actuator 22 as a whole) relative to the member 18. Once calibration is complete, a rotational position of the member 18 is fixed during normal function of the valve 10. This is done, for example, by tightening the connection between the bracket 28 and the housing 12, and/or by drilling a hole through the housing 12 and member 18 and inserting a fixing pin to prevent relative rotation between the two.

The concave portion 46 may have a radial depth that varies about the circumference of the member, so as to form a rounded shape. The concave portion 46 may further have a depth that is greatest at its midpoint. By forming the concave portion 46 as a rounded recession (or concavity), the rotational position of the member 18 has a more gradual and precisely controllable effect on the shape presented to the nozzle openings 52A, 52C, and therefore on the degree of fluid flow.

The effect of the rotational position of the member 18 on obstruction of the nozzle openings 52A, 52C is more precisely controllable than that of the radial position of the nozzles 50A, 50C. Therefore, the nozzles 50A, 50C can be positioned during an initial calibration step to select an initial set of parameters, and then the member 18 can be rotated during a second, more precise calibration step to refine the set of parameters.

It may be desirable to more effectively seal the annular channel 31 formed by the member 26 to prevent any fluid encroachment through the cavity openings 16a, 16b. As described above, this might be partially achieved by matching the size of sections 32, 34 with a size of the cavity 16. However, an O-ring seal 38 might also be provided on the side of the channel 20 nearest the open axial end 12a of the valve housing, sealingly engaging the member 18 at the second section 34 with the surrounding valve housing 12 and thereby providing additional sealing of the channel 20.

Sealing prevents fluid encroachment out of the cavity 16, and additionally prevents undesirable entry of contaminants into the interior of the valve 10. However, the sealing provided by the size-matching of the member 18 and cavity 16, and/or by the O-ring seal 38, does not prevent contamination of the exterior piezoelectric actuator 22.

To this end, a cover 40 may be provided at the axial end 12a of the valve housing 12 at which the actuator 22 is disposed. The cover 40 forms a 'bucket' shape, having an open end, an axially-extending component 40a and a radially-extending component 40b providing a closed end opposite the first end. The axially-extending component 40a extends from the axial end 12a of the valve housing 12, to a point axially beyond the extent of the actuator 22. The radially-extending portion 40b is located at said point so that the second cover 40 encompasses the actuator 22.

It may be necessary for the electrical connection 30 to extend through an opening in the cover 40 to connect the piezoelectric stack 24 to the electrical power source, if externally disposed. A seal 44, for example a rubber seal, may be provided around the electrical connection so as to prevent contamination through the opening 42.

The cover 40 may be secured to the valve housing 12 by any known means, for example by a nut and bolt connection as shown.

The ports 48A, 48B, 48C may be provided with respective screen filters 49A, 49B, 49C to help prevent contaminants from entry into the valve 10 via any of the ports.

In an embodiment, the above-described valve 10 may be used as part of a fuel-metering system, where the fluid passing through the valve is a fuel, the supply is a fuel supply, and the downstream component 70 is a part of an engine requiring fuel.

In an alternative embodiment, the above-described valve 10 may be part of a pneumatic system, where the fluid passing through the valve is air, the supply is an air supply, and the downstream component 70 is a pneumatic actuator.

The valve 10 may be provided as part of an engine for an aircraft, or in an aircraft control surface, for example.

The invention claimed is:

1. A servo valve comprising:
    a valve housing;
    a cavity formed in the valve housing and defining a longitudinal axis (X); and
    a member disposed in the cavity and axially and rotationally moveable therein, along and about said longitudinal axis respectively, wherein the member comprises:
        first and second sections having first and second cross-sectional areas;
        a central section located between the first and second sections and having a third cross-sectional area smaller than both the first and second cross-sectional areas, and;
        first and second transition sections respectively between the first and second sections and the central section, and forming respective first and second outer surfaces angled relative to the axis (X), wherein at least one of the transition sections comprises a non-circular cross-section having a concave portion forming at least part of the respective first and second surfaces, a channel is defined radially between the member and the valve housing, and bounded by the first and second sections, the valve housing comprises a plurality of ports, each forming a fluid passage through the valve housing in fluid communication with the channel, the plurality of ports comprising first and second ports each defining a diameter and having first and second nozzles with first and second nozzle openings for providing fluid communication between the channel and a spool, the first and second nozzle openings each having diameters smaller than the diameter of their respective port, wherein, in a first axial position of the member the second nozzle opening is at least substantially obstructed by the second surface and the first nozzle opening is at least substantially unobstructed by the first surface, and in a second axial position of the member the first nozzle opening is at least substantially obstructed by the first surface and the second nozzle opening is at least substantially unobstructed by the second surface, wherein the concave portion is at least partially aligned with and faces the respective first or second nozzle opening such that rotating the member in said cavity varies the level of obstruction of the first or second nozzle openings in the second or first axial positions respectively.

2. The servo valve of claim 1, wherein the depth of the concave portion varies along its circumference.

3. The servo valve of claim 2, wherein the depth of the concave portion is greatest at a midpoint along its circumference.

4. The servo valve of claim 1, wherein the concave portion extends along the full length of the transition section.

5. The servo valve of claim 1, wherein the concave portion extends around more than 15 degrees of the member, optionally wherein the concave portion extends around more than 30 degrees or more than 45 degrees of the member.

6. The servo valve of claim 1, wherein each of the first and second transition sections comprises a respective concave portion.

7. The servo valve of claim 6, wherein the respective concave portions are circumferentially separated from each other.

8. The servo valve of claim 1, further comprising:
a piezoelectric actuator configured to move the member relative to the valve housing, between said first and second axial positions, optionally wherein the piezoelectric actuator comprises a piezoelectric stack and a frame, the piezoelectric stack is attached to the frame at a first pair of opposed attachment points arranged perpendicular to the axis (X), and the member and the valve housing are attached to the frame at a second pair of opposed attachment points.

9. The servo valve of claim 8, wherein the piezoelectric actuator is arranged outside the valve housing and secured to the valve housing at an axial end thereof by a bracket, optionally wherein the servo valve further comprises a cover secured to the valve housing and comprising an axially-extending portion extending axially beyond the piezoelectric actuator and a radially-extending portion.

10. The servo valve of claim 9, further comprising:
an electrical connection extending from the piezoelectric actuator and through an opening in the cover, the electrical connection configured for connection to an external power source; and
a seal disposed proximate the opening to sealingly engage the electrical connection and the cover.

11. The servo valve of claim 1, further comprising an O-ring seal disposed around the second section of the member to sealingly engage the member and the valve housing.

12. The servo valve of claim 1, further comprising a spool in fluid communication with at least one of the plurality of ports for controlling fluid flow to a component.

13. An assembly comprising:
the servo valve of claim 1;
a component; and
a spool in fluid communication the component and with at least one of the plurality of ports for controlling fluid flow to the component.

14. A method of repairing a valve system comprising:
removing an existing servo valve; and
fitting the servo valve of claim 1.

15. A method of assembling a servo valve, the method comprising:
providing a cavity in a valve housing, the cavity defining a longitudinal axis (X) and the valve housing comprising a plurality of ports, each forming a fluid passage through the valve housing;
assembling a member in the cavity, the member comprising first and second sections having first and second cross-sectional areas, a central section located between the first and second sections and having a third cross-sectional area smaller than both the first and second cross-sectional areas, and first and second transition sections respectively between the first and second sections and the central section and forming respective first and second surfaces angled relative to the axis (X), wherein at least one of the transition sections comprises a non-circular cross-section having a concave portion forming at least part of the respective first and second surfaces, and a channel is defined radially between the member and the valve housing, and bounded by the first and second sections;
assembling first and second nozzles having first and second nozzle openings in first and second ports of the plurality of ports such that the concave portion is at least partially aligned with and faces the respective first or second nozzle opening;
varying a radial position of the first and second nozzles to vary the spacing between the first and second nozzle openings and the first and second surfaces respectively; and
rotating the member about the axis (X) to vary the spacing between the first and/or second surface and the respective first and/or second nozzle openings.

16. The method of claim 15, wherein the step of rotating the member about the axis (X) is performed after the step of varying a radial position of the first and second nozzles such that the rotating step provides a finer calibration of the spacing between the first and second nozzle openings and the first and second surfaces respectively.

* * * * *